US011490567B2

(12) United States Patent
Ruppert et al.

(10) Patent No.: US 11,490,567 B2
(45) Date of Patent: Nov. 8, 2022

(54) SYSTEM FOR UNLOADING PARTICULATE MATERIAL FROM AN AGRICULTURAL MACHINE

(71) Applicant: CNH Industrial America LLC, New Holland, PA (US)

(72) Inventors: Rex Ruppert, Benson, MN (US); Randy Lindemeier, Willmar, MN (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 506 days.

(21) Appl. No.: 16/715,553

(22) Filed: Dec. 16, 2019

(65) Prior Publication Data

US 2021/0176917 A1    Jun. 17, 2021

(51) Int. Cl.
*A01D 41/12* (2006.01)
*B65G 43/08* (2006.01)
(Continued)

(52) U.S. Cl.
CPC ........ *A01D 41/1217* (2013.01); *B60P 1/6409* (2013.01); *B65G 43/08* (2013.01);
(Continued)

(58) Field of Classification Search
CPC ... A01D 41/1217; B60P 1/6409; B65G 43/08; B65G 67/24; B65G 2203/0241; B65G 2814/027
See application file for complete search history.

(56) References Cited

U.S. PATENT DOCUMENTS 3,529,408 A * 9/1970 Keller ................ A01D 41/1208
414/334
7,140,516 B2  11/2006 Bothor et al.
(Continued)

FOREIGN PATENT DOCUMENTS

CN   106211915    12/2016
CN   109220230    1/2019
(Continued)

OTHER PUBLICATIONS

"Lifts & Dumpers"; website accessed on Aug. 23, 2019; 10 pages; Custom Metalcraft, Inc. https://custom-metalcraft.com/lifts/.
(Continued)

*Primary Examiner* — Robert B Davis
(74) *Attorney, Agent, or Firm* — Rebecca Henkel; Rickard DeMille

(57) ABSTRACT

The invention provides an unloading system which can be arranged to move a bin or box a distance away from metering equipment of an agricultural machine, such as a dry pneumatic applicator, to allow access to bottom oriented-gates of the bin and retractable chutes for directing particulate material out of the bin and away from the machine. In one aspect, the bin can be lifted or vertically raised by one or more cylinders to allow access to the bottom gates and allow gravity to empty the material from the box, through the bottom gates, down one or more chutes directed to a particular area. One or more hoppers of the bin, typically 1 to 4, can each have a bottom positioned slide gate or door that can be operated to expose a chute for emptying the material out of the box.

17 Claims, 4 Drawing Sheets

Figure 1:
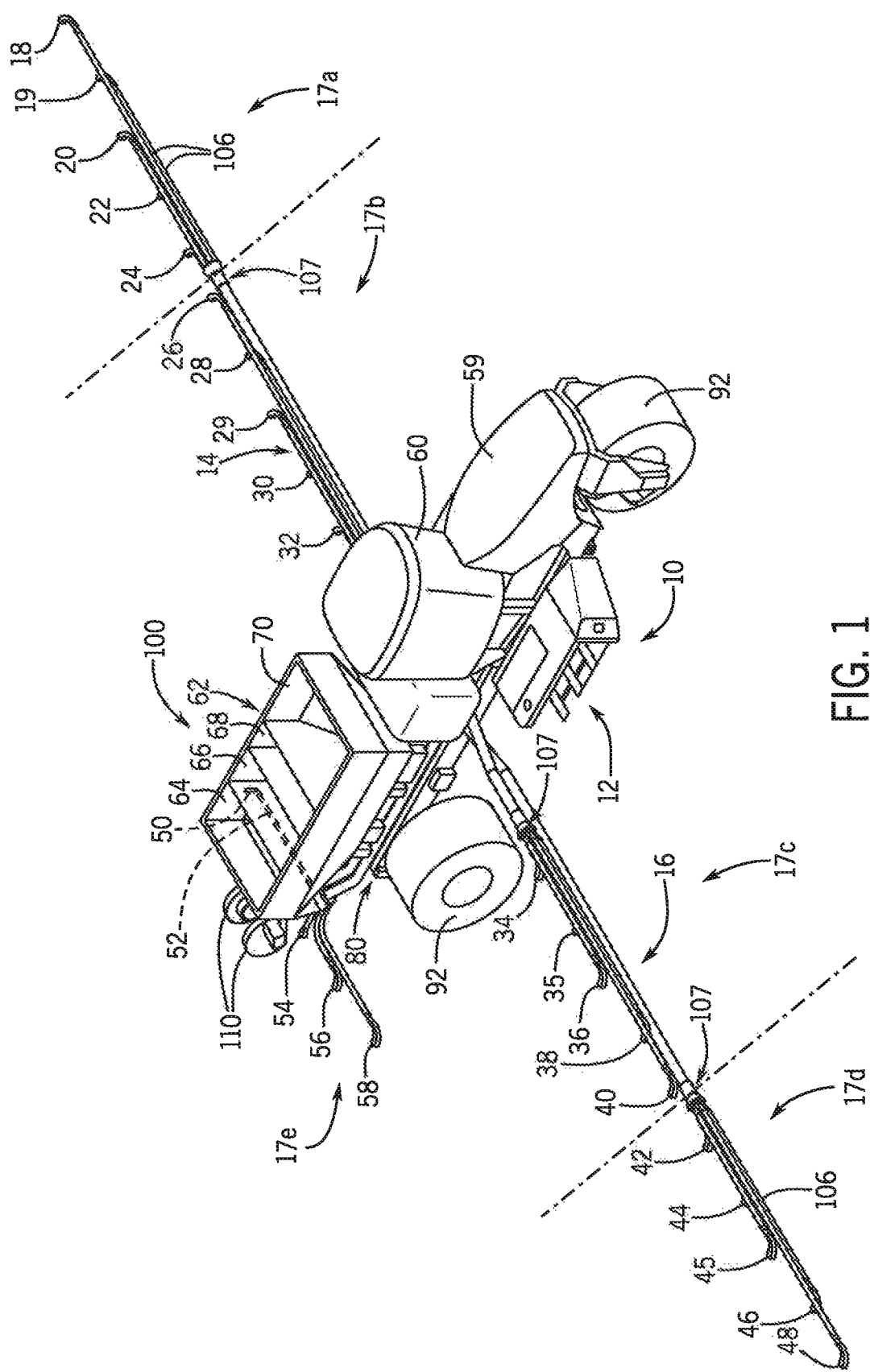
Figure 2:
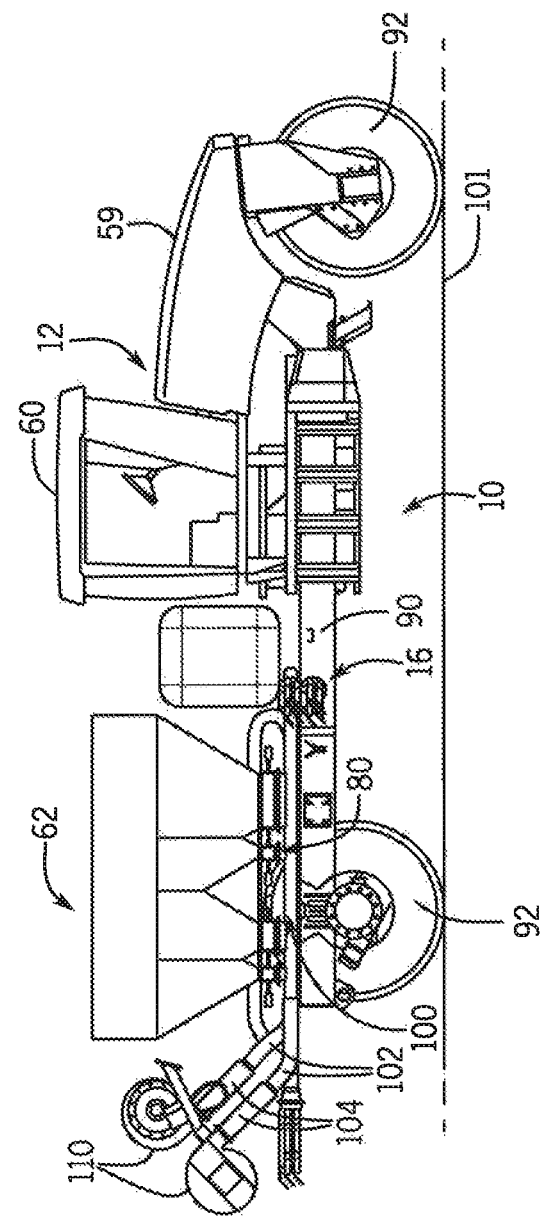

(51) Int. Cl.
*B65G 67/24* (2006.01)
*B60P 1/64* (2006.01)

(52) U.S. Cl.
CPC ...... *B65G 67/24* (2013.01); *B65G 2203/0241* (2013.01); *B65G 2814/027* (2013.01)

(56) References Cited

U.S. PATENT DOCUMENTS

| | | |
|---|---|---|
| 9,033,639 B2 | 5/2015 | Schoenfeld et al. |
| 9,873,570 B2 | 1/2018 | Van Mill et al. |
| 10,278,322 B2 * | 5/2019 | Ankenman .......... A01B 73/044 |
| 2016/0286727 A1 * | 10/2016 | Telkamp ................. B02C 21/02 |
| 2016/0376107 A1 * | 12/2016 | Beaujot ................. B65G 33/14 |
| | | 177/1 |

FOREIGN PATENT DOCUMENTS

| | | |
|---|---|---|
| EP | 1264989 | 12/2002 |
| FR | 1285005 A * | 2/1962 |
| JP | 2013183718 | 9/2013 |
| WO | 2004024603 | 3/2004 |
| WO | 2008145223 | 12/2008 |
| WO | 2015020055 | 2/2015 |

OTHER PUBLICATIONS

"Box Tipper"; website accessed on Aug. 23, 2019; 12 pages; AgriExpo https://www.agriexpo.online/agricultural-manufacturer/box-tipper-171.html.

* cited by examiner

SYSTEM FOR UNLOADING PARTICULATE MATERIAL FROM AN AGRICULTURAL MACHINE

FIELD OF THE INVENTION

The present invention pertains to agricultural equipment and, more specifically, to a system for unloading particulate material stored in a compartment in which an unloading system coupled to the compartment is configured to move the compartment a distance away from a metering system for distributing the particulate material in order to expose a gate for unloading the compartment.

BACKGROUND OF THE INVENTION

Agricultural product delivery systems are known to utilize various mechanisms, including mechanical and pneumatic systems to move granular or particulate material or product, such as fertilizer, seed, insecticide or herbicide, from a product supply chamber, through a series of elongated tubes that extend from a product supply chamber to a product applicator, and placing the product on, or in a growing medium, such as soil. Such agricultural product delivery systems are commonly employed in planters, air drills, fertilizer and pesticide applicators and a variety of other agricultural implements.

In some case it is desirable to quickly empty a bin or box of all such material without having to meter the material to the ground. For example, if an excess amount of material was loaded into the box for a specific operation, or the machine requires maintenance, it may be desirable to quickly transfer such material from the machine to another location, such as another machine or storage unit. However, emptying the box of such material can be time consuming. A need therefore exists to provide a system for unloading of particulate material from an agricultural machine which eliminates one or more of the foregoing disadvantages.

SUMMARY OF THE INVENTION

The invention provides an unloading system which can be arranged to move a bin or box a distance away from metering equipment of an agricultural machine, such as a dry pneumatic applicator, to allow access to bottom-oriented gates of the bin and retractable chutes for directing particulate material out of the bin and away from the machine. In one aspect, the bin can be lifted or vertically raised by one or more cylinders to allow access to the bottom gates and allow gravity to empty the material from the box, through the bottom gates, down one or more chutes directed to a particular area. One or more hoppers of the bin, typically 1 to 4, can each have a bottom positioned slide gate or door that can be operated to expose a chute for emptying the material out of the box.

In one aspect, the unloading system can also allow access to the metering equipment below the bin for maintenance and/or repair. The system could have, for example, four synchronized cylinders, one at each corner of the machine, to vertically lift the bin above the metering equipment. Each cylinder could allow at least 24 inches of movement to provide at least 24 inches of clearance between bins and meters disposed below the bins.

Specifically then, one aspect of the present invention can provide a system for unloading particulate material, including: a compartment for carrying particulate material; a gate configured to open and close, the gate providing access to an interior of the compartment when opened and blocking access to the interior of the compartment when closed; a metering system arranged proximal to the gate, the metering system being configured to distribute particulate material from the compartment when the gate is opened; and an unloading system coupled to the compartment, the unloading system being configured to move the compartment a distance away from the metering system to expose the gate.

Another aspect of the present invention can provide a method for unloading particulate material, including: carrying particulate material in a compartment; providing a gate configured to open and close, the gate for providing access to an interior of the compartment when the gate is opened and blocking access to the interior of the compartment when the gate is closed; arranging a metering system proximal to the gate, the metering system for distributing particulate material from the compartment when the gate is opened; and providing an unloading system coupled to the compartment, the unloading system for moving the compartment a distance away from the metering system to expose the gate.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 1 illustrates an isometric view of an exemplary embodiment of an agricultural application implement, in the form of a dry granular applicator, comprising a system for unloading particulate material in accordance with an aspect of the present invention;

FIG. 2 illustrates a side elevation view of the applicator of FIG. 1;

FIG. 3 illustrates a front view of a system for unloading particulate material in accordance with an aspect of the present invention; and FIG. 4 illustrates a side view of a system for unloading particulate material in accordance with an aspect of the present invention.

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Referring now to the drawings, and more particularly to FIGS. 1 and 2, there is shown an agricultural application implement 10, which could be a dry pneumatic granular applicator, which can include a system for unloading particulate material in accordance with an aspect of the present invention. As is known in the art, implement 10 generally includes a large wheeled transport unit 12 such as truck or tractor, and laterally extending particle delivery booms 14 and 16, which may be pivoted to a stowed position close to the implement for storage or transport. Each boom 14, 16 extends laterally from the implement 10 in opposite directions. Each boom 14, 16 includes a plurality of boom sections 17, such as left outer and left inner boom sections 17a, 17b of boom 14, and right inner and right outer boom sections 17c, 17d of boom 16. Each boom section 17 is defined by a large diameter supply line 102 for supplying the boom section with airflow from one or more fans 110 and entrained granular or particulate material, such as seed, fertilizer, herbicide, insecticide and the like. Each boom section 17 includes a plurality of boom tubes or conduits terminating at particle delivering units, which for the implement 10 are spreading outlets or nozzles. In the exemplary embodiment shown, left outer boom section 17a of boom 14 includes five nozzles 18, 19, 20, 22 and 24; left inner boom section 17b of boom 14 includes five nozzles 26, 28, 29, 30 and 32; right inner boom section 17c of boom 16 includes five nozzles 34, 35, 36, 38 and 40; and right outer boom section 17d of boom 16 includes five nozzles 42, 44, 45, 46 and 48. Additionally, at the back of implement 10 there is a centrally mounted rear boom section 17e also defined by a large diameter supply line 102 for supplying the boom section with granular material. At the rear boom section 17e are five rear nozzles 50, 52, 54, 56 and 58 to provide full and complete coverage across the width of implement 10, including the area between the inboard-most nozzles 32 and 34 of booms 14, 16. The rear boom section 17e allows spread of the particulate material/product over/onto the ground over which the implement 10 passes for complete coverage. Although five boom sections 17, with five nozzles per boom section, is shown by way of example, in other aspects greater or fewer boom sections 17, and/or greater or fewer nozzles per boom section 17, can be provided within the scope of the invention.

The transport unit 12 can be self-propelled by an engine in an engine compartment 59 and can include an operator cab 60 having a Human Machine Interface (HMI) available to the user. The transport unit 12 can comprise a frame 90 supported by wheels 92. In the exemplary embodiment shown, an uncovered tank 62, open to the environment and ambient atmospheric conditions, includes compartments 66 and 70 for carrying particulate material to be distributed by a metering array 80 for ultimate disbursement by nozzles 18-58. Further smaller compartments 64 and 68 are provided to supply micro-nutrients or other materials to the metering array 80. The supply of particulate in compartments 64, 66, 68, 70 can be replenished periodically from a supply vehicle (not shown). The tank 62 could have, for example, a capacity of about 350 cubic feet and/or 11 tons.

Figure 3:
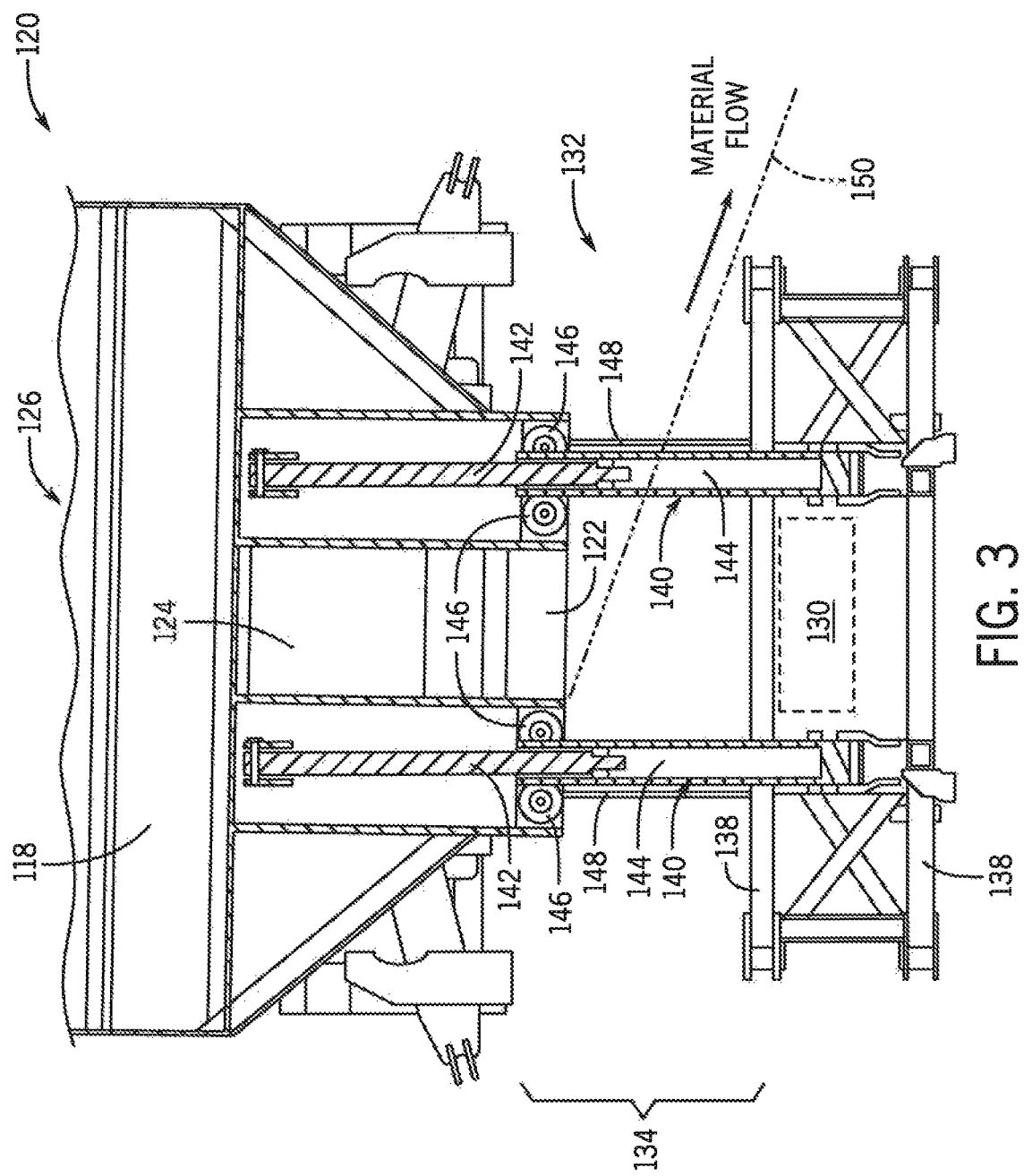

With additional reference to FIG. 3, a front view of a system 120 for unloading particulate material, which system could be implemented on the implement 10, is provided in accordance with an aspect of the present invention. The system 120 can include one or more gates 122, each being configured to open and close with respect to a given compartment 124 of a tank 118 (typically 1 to 4 compartments), such as with respect to any of compartments 64, 66, 68, 70 of tank 62. The gate 122 can provide access to an interior 126 of compartment 124 when opened and block access to the interior 126 of the compartment when closed. A metering system 130 of the machine, such as the metering array 80 of the implement 10, can arranged proximal to the gate 122, preferably being disposed immediately below the gate 122.

For conducting agricultural field operations, the metering system 130 can be configured to distribute particulate material from the compartment 124, and out to a corresponding supply line 102 and section 17, when the gate 122 is opened.

An unloading system 132 can be coupled to the compartment 124. The unloading system can be configured to move the compartment 124 a distance 134 away from the metering system 130 to expose the gate 122. In one aspect, the unloading system 132 can comprise multiple hydraulic cylinders 140 supported by a frame 138 of the machine, such as the frame 90 of the implement 10, which cylinders can be synchronized with one another. The hydraulic cylinders 140 could each comprise a rod 142 configured to extend and retract respect to a cylinder 144 when electronically controlled by a control system of the machine to actuate (illustrated as fully extended in FIG. 3). Each cylinder could allow at least 24 inches of movement to provide at least 24 inches of clearance, via the distance 134, between the compartment 124 and the metering system 130 disposed below the compartment 124. In one aspect, there could be four hydraulic cylinders 140, with each hydraulic cylinder being arranged at a given corner of the frame 90, supporting the tank 118. In addition, multiple rollers 146 can be configured along supporting tracks 148, supported by the frame 138, to guide movement of the tank 118, and corresponding compartment 124, up and down relative to the metering system 130 and the frame 138.

Accordingly, the unloading system 132 can move the compartment 124 a distance away from the metering system 130 to allow access to bottom-oriented gates 122 of each compartment 124. In addition, downwardly angled deployable/retractable and/or attachable chutes 150 or ramps can be configured with respect to the gates 122 for directing flow of the particulate material ("material flow") out of compartments 124, above the metering system 130, and away from the machine. When gates 122 are open, gravity can pull the particulate material out of the compartments 124 and downward along such chutes 150 to another location, such as another machine or storage unit. This can also allow access to the metering system 130 for maintenance and/or repair.

In one aspect, a control system of the machine can be configured to control the system 120 according to input provided by the HMI in the cab 60. In particular, the control system could receive a lift command via the HMI, causing the control system to execute to synchronously, fully extend the hydraulic cylinders 140 of the unloading system 132 above the metering system 130. The control system could then receive a chute deployment command, causing the control system to execute to selectively deploy one or more chutes 150. The control system could then receive an open command, causing the control system to execute to selectively open one or more gates 122, causing particulate material to flow out of compartments 124 corresponding to the gates 122, above the metering system 130, and away from the machine. After sensing the compartments 124 to be empty, and indicating such to the HMI, the control system could then receive a close command, causing the control system to execute to close the one or more open gates 122. The control system could then receive a chute retraction command, causing the control system to execute to retract the one or more deployed chutes 150. Finally, the control system could receive a lower command, causing the control system to execute to synchronously, fully retract the hydraulic cylinders 140 of the unloading system 132 to a default position, with the metering system 130 arranged proximal to the gates 122, ready to distribute particulate material.

Figure 4:
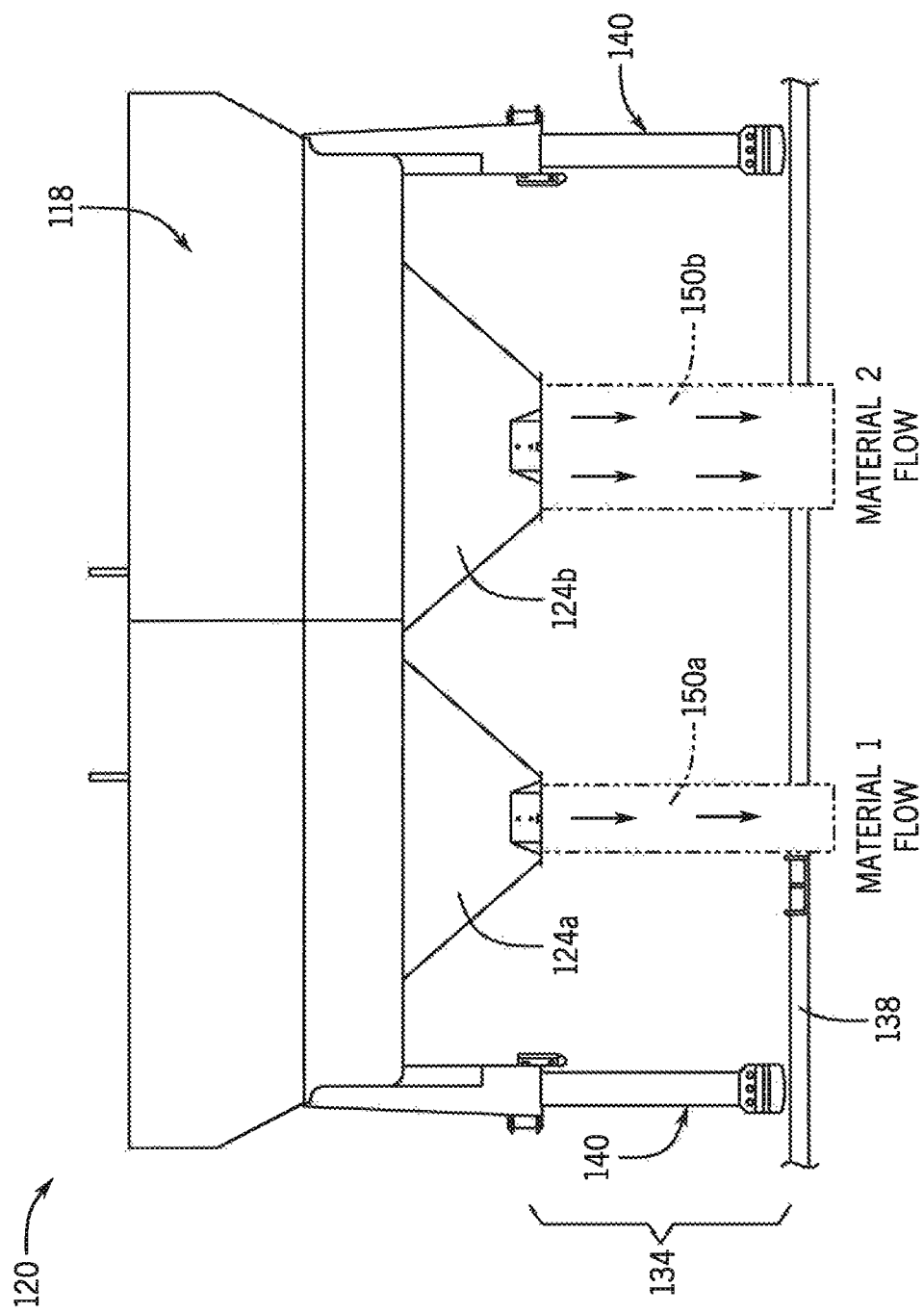

In addition, with additional reference to FIG. 4, a side view of the system 120 for unloading particulate material, compartments 124 and chutes 150 can be configured in different sizes to accommodate different volumes and rates of flow. For example, a first compartment 124a could correspond to a first, smaller chute 150a, for allowing a smaller amount of particulate material to flow ("material 1 flow") from the first compartment 124a, while a second compartment 124b could correspond to a second, larger chute 150b, for allowing a larger amount of particulate material to flow "material 2 flow") from the second compartment 124b.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A system for unloading particulate material, comprising:
   a compartment for carrying particulate material;
   a gate configured to open and close, the gate providing access to an interior of the compartment when opened and blocking access to the interior of the compartment when closed;
   a metering system arranged proximal to the gate, the metering system being configured to distribute particulate material from the compartment when the gate is opened; and
   an unloading system coupled to the compartment, the unloading system being configured to move the compartment a distance away from the metering system to expose the gate.

2. The metering system of claim 1, wherein the unloading system comprises a plurality of hydraulic cylinders.

3. The metering system of claim 2, further comprising a frame supporting the unloading system, the frame being supported by a plurality of wheels, wherein the plurality of hydraulic cylinders comprises four hydraulic cylinders, and wherein each hydraulic cylinder is arranged at a corner of the frame.

4. The metering system of claim 2, wherein the unloading system further comprises a plurality of rollers configured to guide movement of the compartment.

5. The metering system of claim 2, wherein each hydraulic cylinder comprises a rod configured to extend and retract.

6. The metering system of claim 1, wherein the unloading system is configured to move the compartment a distance of at least 24 inches away from the metering system.

7. The metering system of claim 1, further comprising a control system, wherein the gate, the metering system and the unloading system are electronically controlled by the control system.

8. The metering system of claim 1, wherein the compartment, the gate and the metering system are a first compartment of a plurality of compartments, a first gate of a plurality of gates and a first metering system of a plurality of metering systems, respectively, and wherein the unloading system is configured to move the plurality of compartments a distance away from the plurality of metering systems to expose the plurality of gates.

9. The metering system of claim 1, further comprising a chute configured to direct particulate material from the compartment and away from the metering system when the compartment is moved a distance away from the metering system and the gate is opened.

10. The metering system of claim 1, wherein the unloading system is configured to move the compartment a distance away from the metering system by vertically raising the compartment above the metering system.

11. A method for unloading particulate material, comprising:
    carrying particulate material in a compartment;
    providing a gate configured to open and close, the gate for providing access to an interior of the compartment when the gate is opened and blocking access to the interior of the compartment when the gate is closed;
    arranging a metering system proximal to the gate, the metering system for distributing particulate material from the compartment when the gate is opened; and
    providing an unloading system coupled to the compartment, the unloading system for moving the compartment a distance away from the metering system to expose the gate.

12. The method of claim 11, further comprising the unloading system including a plurality of hydraulic cylinders.

13. The method of claim 12, further comprising the unloading system including a plurality of rollers for guiding movement of the compartment.

14. The method of claim 12, further comprising electronically controlling the gate, the metering system and the unloading system.

15. The method of claim 11, further comprising configuring a chute to direct particulate material from the compartment and away from the metering system when the compartment is moved a distance away from the metering system and the gate is opened.

16. The method of claim 11, further comprising the unloading system moving the compartment a distance away from the metering system by vertically raising the compartment above the metering system.

17. An agricultural application implement, comprising:
    a compartment for carrying particulate material;
    a gate configured to open and close, the gate providing access to an interior of the compartment when opened and blocking access to the interior of the compartment when closed;
    a metering system arranged proximal to the gate, the metering system being configured to distribute particulate material from the compartment when the gate is opened;
    an unloading system coupled to the compartment, the unloading system being configured to move the compartment a distance away from the metering system to expose the gate; and
    a frame supporting the unloading system, the frame being supported by a plurality of wheels, wherein:
    the plurality of hydraulic cylinders comprises four hydraulic cylinders,
    each hydraulic cylinder is arranged at a corner of the frame, and
    the unloading system comprises a plurality of hydraulic cylinders.

* * * * *